United States Patent [19]

El-Genk

[11] Patent Number: 5,428,653
[45] Date of Patent: Jun. 27, 1995

[54] APPARATUS AND METHOD FOR NUCLEAR POWER AND PROPULSION

[75] Inventor: Mohamed El-Genk, Alburquerque, N. Mex.

[73] Assignee: University of New Mexico, Albuquerque, N. Mex.

[21] Appl. No.: 103,426

[22] Filed: Aug. 5, 1993

[51] Int. Cl.⁶ ............................................. G21C 23/00
[52] U.S. Cl. .................................. 376/318; 376/381; 376/382; 376/909; 376/319
[58] Field of Search ................ 376/318, 909, 911, 319, 376/381, 382, 386, 387

[56] References Cited

U.S. PATENT DOCUMENTS

| | | | |
|---|---|---|---|
| 2,870,608 | 1/1959 | Comyns-Carr | 376/318 |
| 2,882,687 | 4/1959 | Stivender | 376/318 |
| 3,941,187 | 3/1976 | Jabsen et al. | 376/318 |
| 4,761,260 | 8/1988 | Schmitt et al. | 376/381 |
| 5,106,574 | 4/1992 | El-Genk et al. | 376/382 |

OTHER PUBLICATIONS

El-Genk, et al., "Thermal-Hydraulic Analysis of Pellet Bed Reactor," *Amer. Inst. of Aeronautics and Astronautics, Inc.*, (AIAA 91-3510) (1991).
El-Genk, et al., "Pellet Bed Reactor Concepts for Nuclear Propulsion Applications," *Amer. Inst. of Aeronautics and Astronautics, Inc.*, (93-2112) (1993).
El-Genk, et al., "Pellet Bed Reactor for Nuclear Thermal Propelled Vehicles," *American Institute of Physics*, pp. 607-617 (1991).
El-Genk, et al., "Pellet Bed Reactor Concept for Nuclear Electric Propulson," *American Institute of Physics*, pp. 631-639 (1993).
Jahasz, El-Genk, et al., "Closed Brayton Cycle Power System with a High Temperature Pellet Bed Reactor Heat Source for NEP Applications," *American Institute of Physics*, pp. 1055-1064 (1993).
Morley and El-Genk, "Passive Decay Heat Removal in the PeBR Concept for Nuclear Thermal Propulson," *American Institute of Physics*, pp. 955-966 (1992).
Morley and El-Genk, "Neutronics and Safety Analysis of Pellet Bed Reactor for Nuclear Thermal Propulsion," *American Institute of Physics*, pp. 923-933 (1993).
Morley and El-Genk, "Two Dimensional Thermal-Hydraulic Analyses of the Pellet Bed Reactor for Nuclear Thermal Propulsion," *Amer. Inst. of Aeronautics and Astronautics (AIAA 93-2615) (1993)*.
Nabielek, et al., "Fuel for Pebble-Bed HTRs," *Nuclear Engineering and Design*, vol. 78 pp. 155-166 (1984).
Palmer, "The Brayton Cycle," *Handbook of Applied Thermodynamics*, pp. 325-328 CRC Press, Boca Raton FL (1987).
Ross, et al., "Uranium Nitride Fuel Swelling Correlation," *Journal of Nuclear Materials*, vol. 170, pp. 169-177 (1990).
Walton, et al., "Element Design," *Amer, Inst. of Aeronautics and Astronautics*, (AIAA 93-2114) (1993).
M. S. El-Genk, "High Performance Bimodal Space Nuclear Power and Propulsion System." *Proc. 11th Symp. Space Nuclear Power Systems*, CONF-940104, M. S. El-Glen, ed., American Institute of Physics, New York, N.Y. (to be published in 1994).
J. Liscum-Powell, et al., "Neutronic Analysis and Design Optimization of the Pellet Bed Reactor for Bimodal Applications," *Proc. 11th Symp. Space Nuclear Power Systems*, CONF-940104, M. S. El-Genk, ed., *American Institute of Physics*, New York, N.Y. (to be published in 1994).

*Primary Examiner*—Donald P. Walsh
*Assistant Examiner*—Frederick H. Voss
*Attorney, Agent, or Firm*—Donovan F. Duggan

[57] ABSTRACT

A bimodal nuclear power and propulsion system for space is disclosed. Closed cycle heat engines are in operative association with each sector of a sectored reactor core. Heat exchangers employing waste heat, electric power and reactor heat are used to heat propellant to increase Isp. Non-nuclear ground testing of the system is also disclosed.

35 Claims, 4 Drawing Sheets

APPARATUS AND METHOD FOR NUCLEAR POWER AND PROPULSION

BACKGROUND OF THE INVENTION

1. Field of the Invention (Technical Field)

The invention relates to nuclear reactor source and system apparatus for generating power and propulsion in space; and a method of using such apparatus.

2. Background Art

Bimodal space nuclear reactor power and thermal propulsion systems theoretically could enable a variety of space missions. Examples of such missions might include a new generation of wide-band surveillance satellites, planetary exploration, global air traffic control, transport of payloads to higher orbits, and repositioning of satellites in orbits.

Such mission requirements cannot presently be met. Conventional bimodal (or hybrid) solar electronic or chemical propulsion systems are slow, have limited maneuvering capabilities, and have relatively large sizes and masses.

While electric propulsion systems are capable of generating high average specific impulse ($I_{sp}$), their thrust capability is limited. Electric bimodal missions could require tens of kilowatts, up to 10 years duration, thrust of up to thousands of Newton and Isp of 600 to 850 seconds, for hundreds of hours.

U.S. Pat. No. 5,106,574 to El-Genk, et al., entitled Nuclear Reactor Refuelable in Space, issued Apr. 21, 1992, discloses a sectored reactor with fuel pellets, thereby enabling fueling or refueling in space or on the ground, as well as operational redundancy.

Morley and El-Genk, "Passive Decay Heat Removal in the PeBR Concept for Nuclear Thermal Propulsion," *Proc. 9th Symp. on Space Nuclear Power Systems*, CONF-920104, M.S. El-Genk and M.D. Hoover, eds. *American Institute of Physics*, New York, N.Y., Conference Proc. No. 246, 3:955–966 (1993), discusses passive decay heat removal after shutdown. Liscum-Powell, J. and M.S. El-Genk, "Neutronic Analysis and Design Optimization of the Pellet Bed Reactor for Bimodal Applications," *Proc. 11th Symp. Space Nuclear Power Systems*, CONF-940104, M.S. El-Genk, ed., *American Institute of Physics*, New York, N.Y. (to be published in 1994) discusses bimodal reactors design of pellet bed reactor for bimodal space application.

Juhasz, A., M.S. El-Genk, and W. Harper, "Closed Brayton Cycle Power System with a High Temperature Pellet Bed Reactor Heat Source for NEP Applications," *Proc. 10th Symp. on Space Nuclear Power and Propulsion*, CONF-930103, M.S. El-Genk and M.D. Hoover, eds., *American Institute of Physics*, New York, N.Y., Conference Proc. No. 271 2:1055–1064 (1993) discusses sectored reactor core structure in combination with closed cycle gas turbine engines.

El-Genk, et al., "High Performance Bimodal Space Nuclear Power and Propulsion System" *Proc. 11th Symp. Space Nuclear Power Systems*, CONF-940104, M.S. El-Genk, ed., *American Institute of Physics*, New York, N.Y. (to be published in 1994) details design approaches for potential bimodal power systems.

SUMMARY OF THE INVENTION (DISCLOSURE OF THE INVENTION)

In accordance with the present invention there is provided a bimodal nuclear power and propulsion system comprising a sectored reactor core, a plurality of closed cycle gas turbine engines in operative association with the sectored reactor core, and a plurality of heat exchangers heated by the closed cycle gas turbine engines and the sectored reactor core. Each sector of the sectored reactor core comprises a 120° core sector bounded by axially extending divider walls comprising heat exchangers for heating propellant. Each of the 120° core sectors is radially bounded by cylindrical frits.

The sectored reactor core is loaded with spherical fuel pellets which comprise UC or $UO_2$. The diameter of the spherical fuel pellets comprises a function of power and safety parameters.

Each of the closed cycle gas turbine engines is in operative association with each of the 120° core sectors. The closed cycle gas turbine engines may comprise closed Brayton cycle engines, each of which is in operative association with each 120° core sector. Each 120° core sector may be self contained and independently operable or jointly operable with each other 120° core sector.

At least one of the heat exchangers is heated with waste heat from the closed cycle gas turbine engines, and at least one of the heat exchangers is heated with electric power from the closed cycle gas turbine engines. The heat exchangers heated with waste heat comprises a propellant preheater, and the heat exchangers heated with electric power comprises an electric heater for superheating and thereby increasing specific impulse of a propellant.

In accordance with the present invention there is also provided a method of bimodally operating a nuclear power and propulsion system comprising the steps of sectoring a reactor core, operatively associating a plurality of closed cycle gas turbine engines with the sectored reactor core, and heating a plurality of heat exchangers with the closed cycle gas turbine engines and the sectored reactor core. The step of sectoring the reactor core further comprises the step of bounding 120° core sectors with axially extending divider wall and providing heat exchangers in the divider walls for heating propellant. The step of bounding 120° core sectors further comprises the step of radially bounding the 120° core sectors by cylindrical frits.

The method of the invention further comprises the step of loading the reactor core with spherical fuel pellets which may be UC or $UO_2$ fuel pellets. The step of loading spherical fuel pellets further comprises the step of loading fuel pellets comprising a diameter which is a function of power and safety parameters.

The method of the invention further comprises the step of operatively associating at least one of the closed cycle gas turbine engines or closed cycle Brayton engines with at least one of the 120° core sectors. The method of the invention further comprises the step of independently or jointly operating each of the 120° core sectors with each other 120° core sector.

The method of the invention further comprises the step of heating the heat exchangers with waste heat and electric power from the closed cycle gas turbine engines. The step of heating a heat exchanger with waste heat further comprises the step of preheating a propellant, while the step of heating a heat exchanger with electric power further comprises the step of superheating and thereby increasing specific impulse of a propellant.

In accordance with the present invention there is also provided a method of testing a bimodal space nuclear power and propulsion system comprising the steps of providing electric heaters for the system, providing non-nuclear fuel pellets for the system, testing the system with the electric heaters and non-nuclear fuel pellets, and thereafter benchmarking reactor thermal hydraulics models and examining operation of energy conversion and propulsion system.

An object of the invention is the provision of design modularity to support evolutionary development of power and propulsion requirements;

Another object of the invention is the provision of a fast spectrum nuclear reactor scalable to higher power and thrust levels and in which the operating parameter of the reactor core are maintained the same during both power and propulsion modes;

Yet another object of the invention is the provision of a reactor operational at a relatively low maximum fuel temperature;

Still another object of the invention is the provision of redundancy in reactor control.

A further object of the invention is the use of waste heat to preheat propellant;

Yet another object of the invention is the provision of high average specific impulse by superheating the propellant with electric heaters;

Still another object of the invention in the provision of non-nuclear ground testing of the fully integrated bimodal system;

An advantage of the invention is the provision of a sectored reactor core and multiple closed cycle gas turbine engines eliminating single point failure and hot spots in the reactor core Another advantage of the invention is the provision of efficient closed cycle gas turbine engines providing lower fuel burnup larger lifetime, and smaller reactor size and mass;

Still another advantage of the invention is the use of spherical fuel pellets, thereby retaining fission products and providing high power density;

Yet another advantage is the provision of passive cooling and decay heat removal for enhanced safety.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Figure 1:
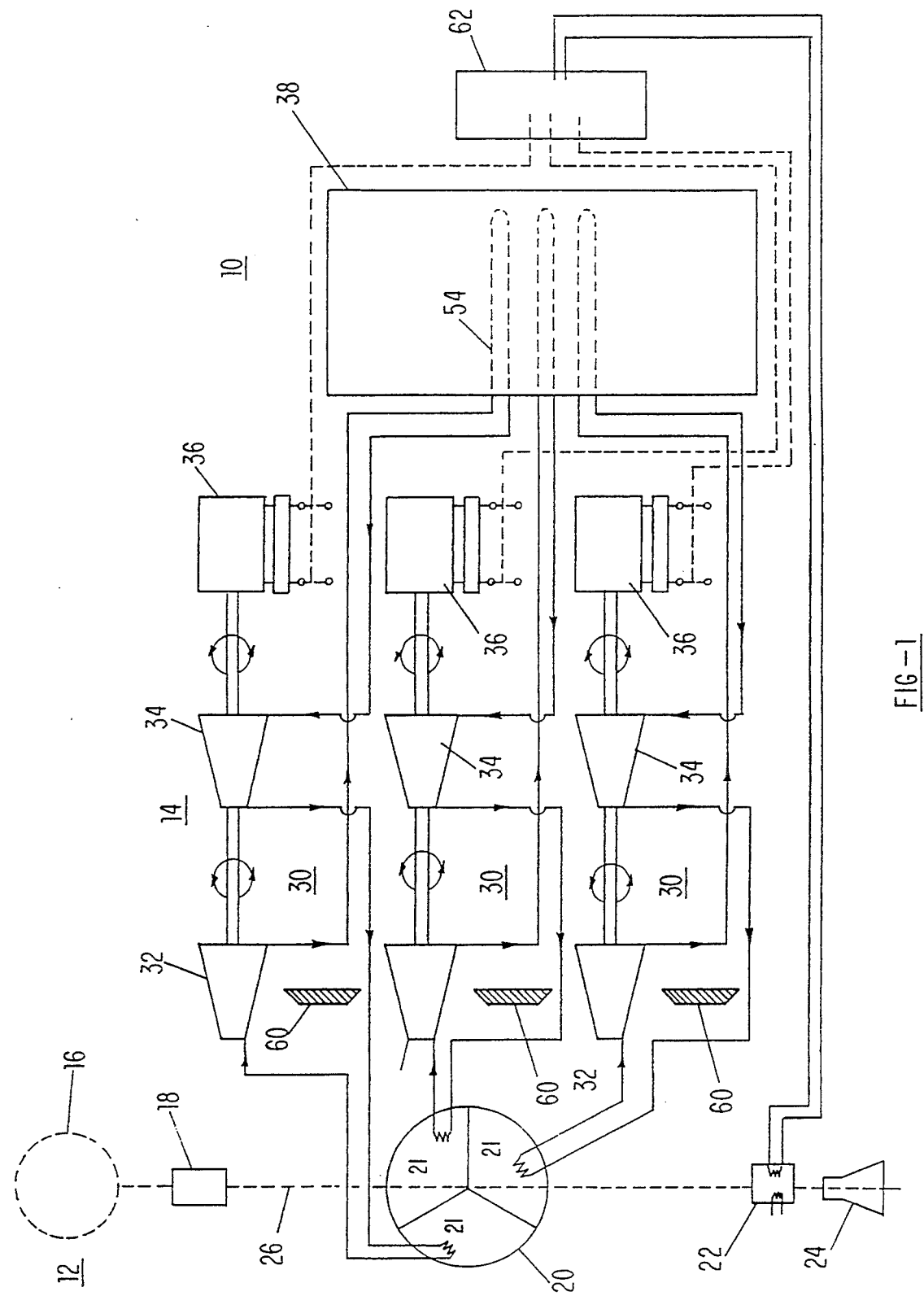
FIG. 1 is a schematic diagram of the nuclear power (solid lines) and propulsion system (dotted lines)
Figure 2:
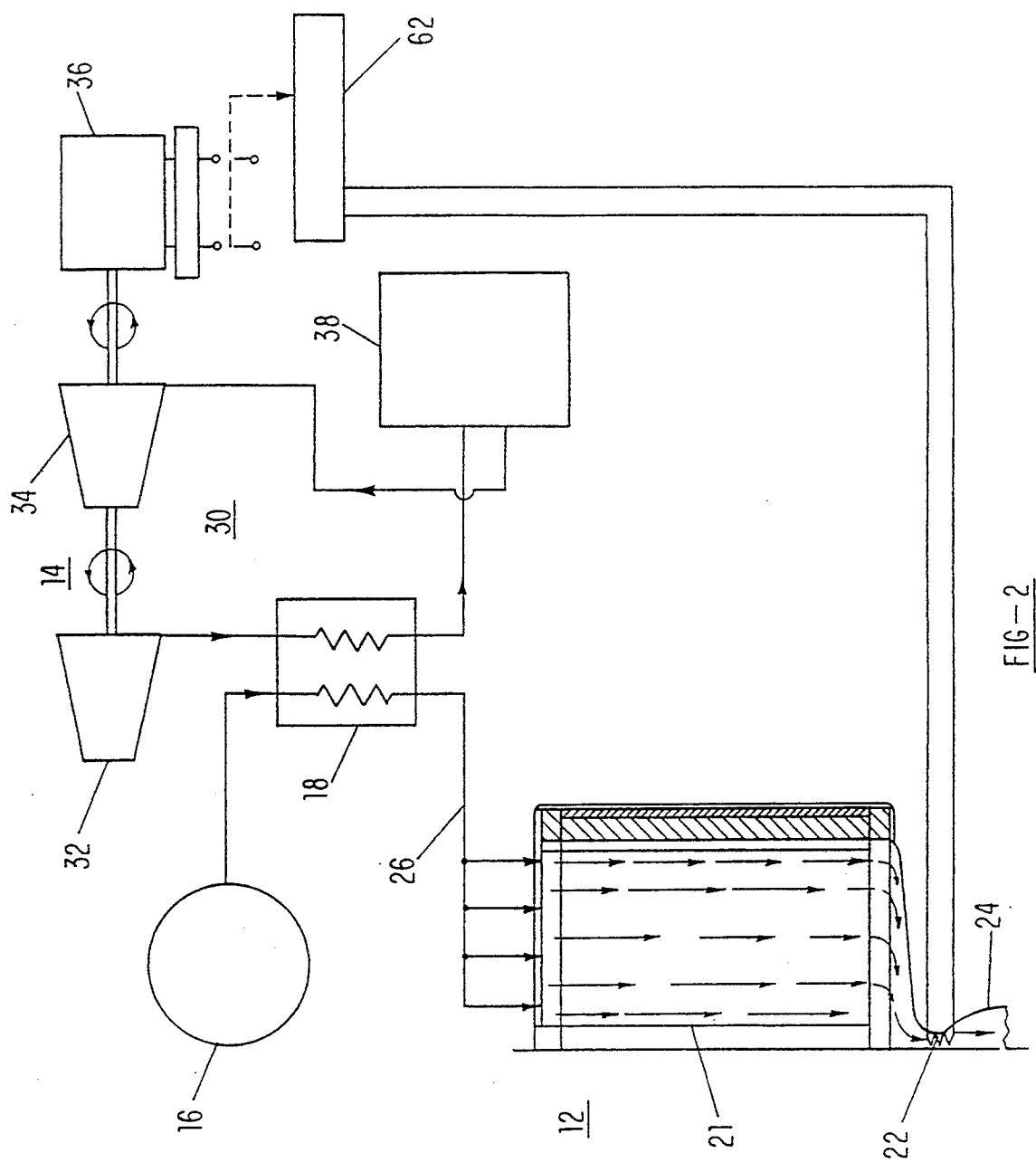
FIG. 2 is a schematic diagram of propellant heating in the propulsion mode.

With reference to FIGS. 1 and 2, a schematic overview of the preferred embodiment of the invention is therein depicted. Nuclear power and propulsion system 10 generally comprises propulsion system 12 (dotted lines) and power system 14 (solid lines). Propulsion system 12 employs hydrogen as a propellant and comprises pressurized liquid hydrogen tank 16, hydrogen preheater 18, reactor core 20, electric superheater 22, and thruster 24. Hydrogen is transported between the various components of the propulsion system by feed line 26.

Power system 14 generally comprises a three-sectored reactor core 21. Closed Brayton cycle engine 30 is in operative association with each sector 21 of the reactor core 20. Each closed Brayton cycle engine 30 comprises turbine 32, compressor 34, alternator 36, the respective reactor core sector 21, and main radiator 38. The working fluid is helium which also serves as a coolant for the reactor core 20.

TABLE 1

| Design Requirements and Operation Parameters | |
|---|---|
| PARAMETER | VALUE |
| Electric Power (kWe) | 10–40 |
| Average Specific Impulse (s) | 650–800 |
| Thrust (N) | 1–40 |
| Excess Reactivity at BOM ($) | 3.0 |
| Maximum Fuel Temperature (K) | 1600 |
| Coolant Type for Power Mode | Helium |
| Propellant Type | Hydrogen |
| Operation Lifetime (yrs.) | 10 |
| Decay Heat Removal | Fully Passive |
| Fuel Pellet | Spherical |
| Fuel Pellet Diameter (mm) | 10 |
| Fuel Type | UC |
| Fuel Enrichment (%) | 95 |
| Reflector Material | Be |
| Poison & Safety Rod Material | $B_4C$ |
| Hot & Cold Frit Material | Carbon/Carbon Composite |
| Core Sector Divider/Heat Exchanger Material | Graphite |

Table 1 summarizes the design and operation parameters of power and propulsion system 10.

Figure 3:
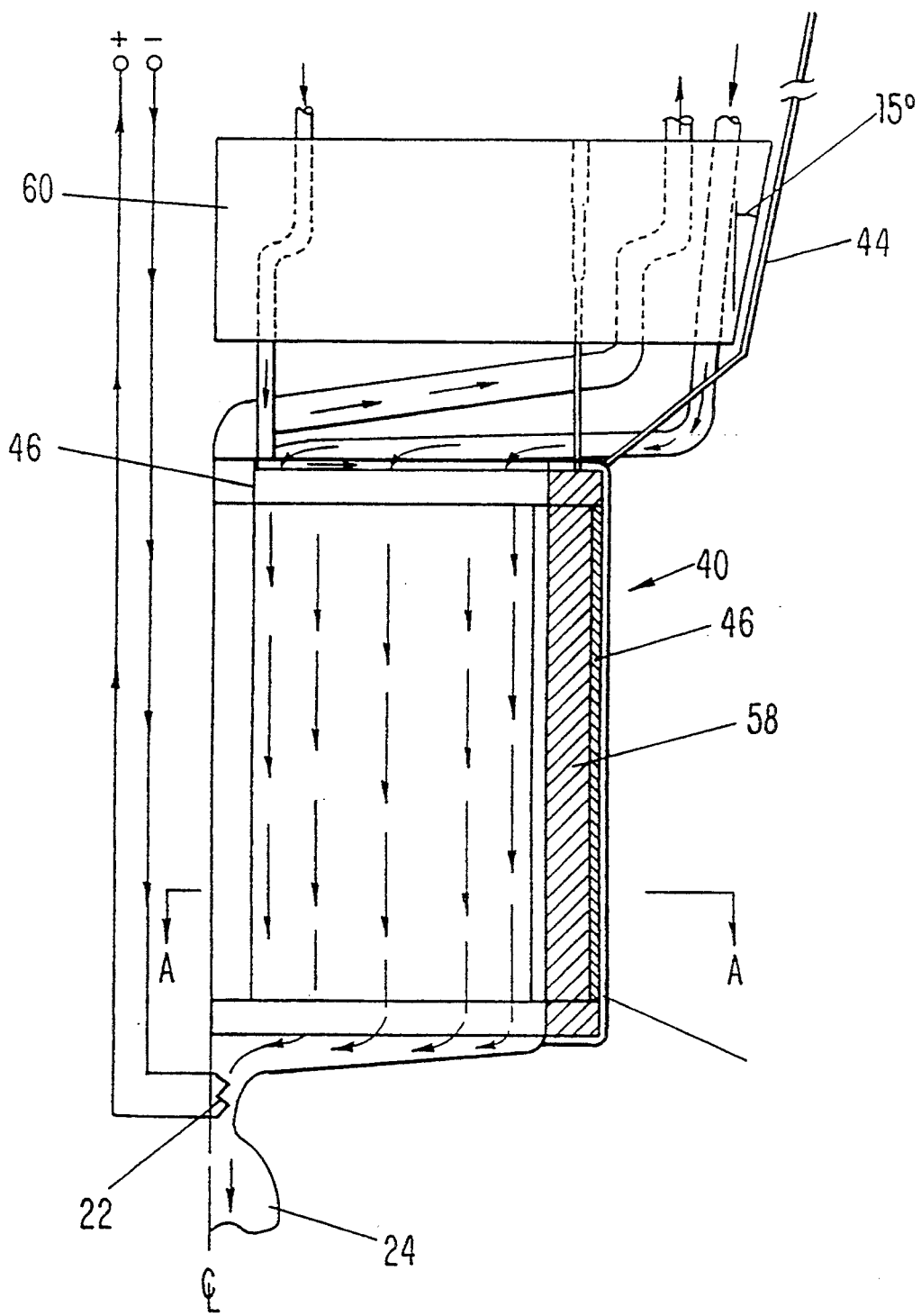
FIG. 3 is a longitudinal cross-section of the reactor core.
Figure 4:
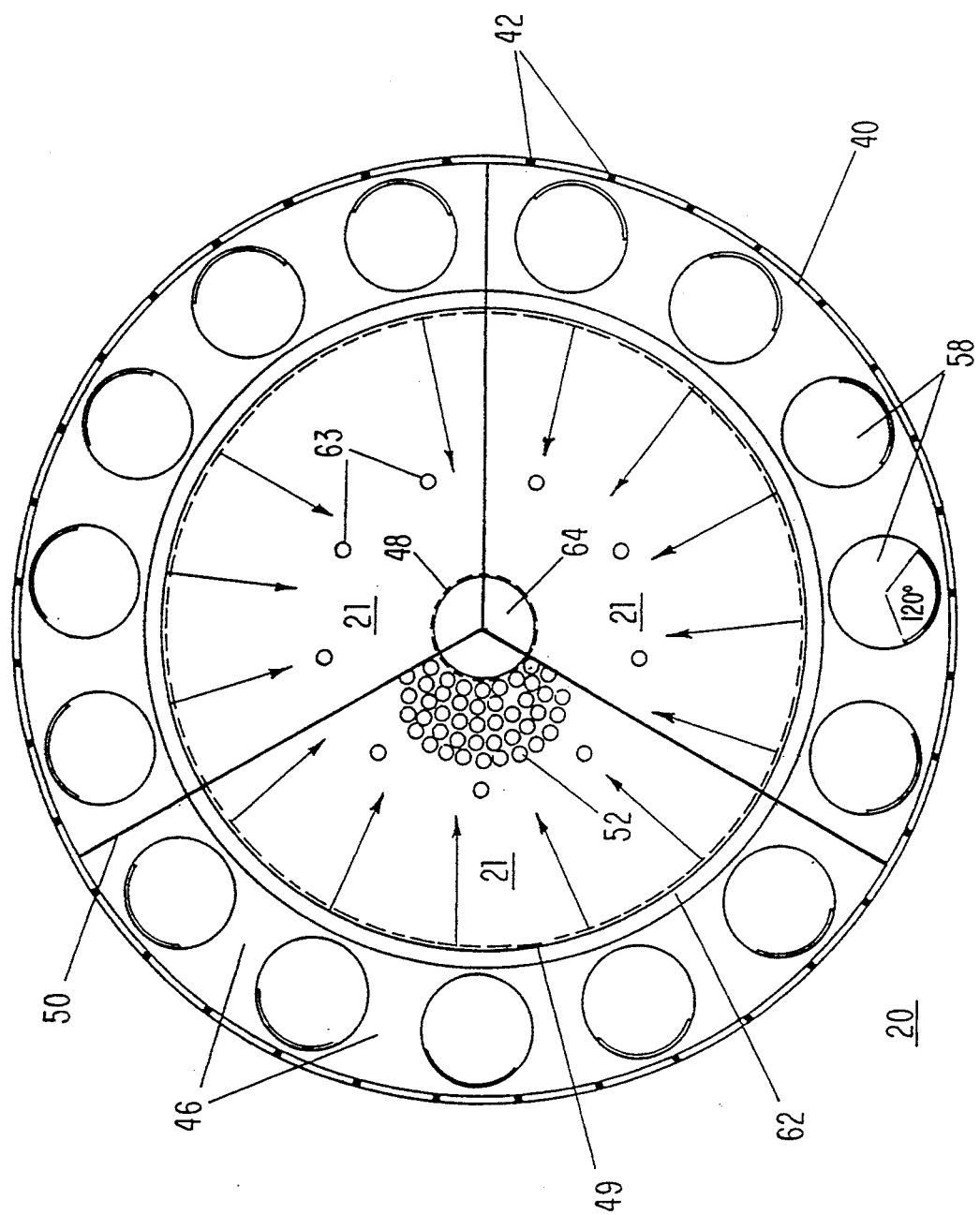
FIG. 4 is a radial cross-section along plane A—A.

FIGS. 3 and 4 illustrate the reactor core structure in detail. Core 20 is surrounded and bounded by outer cylindrical reactor vessel 40 of stainless steel or like material capable of withstanding the pressures (and vacuum) likely to be encountered in space. Reactor vessel 40 contains a plurality of heat pipes 42 connected to independent heat pipe radiator 44. Heat pipes 42 and radiator 44 form an auxilliary, independent cooling system for passive removal and rejection of fission or decay heat generated after shutdown. Preferably, potassium is the working fluid in heat pipes 42, but other fluids well known in the heat pipe art could be utilized for example, Na.

Annular beryllium carbide reflector 46 is positioned inwardly of pressure vessel 40 and is in radially and axially surrounding relationship to reactor core sectors 21. Beryllium carbide reflector 46 flattens axial and radial fission power profiles in reactor core 20. Reflectors 46 receive radiated heat from cold frit 48, then conduct such heat to the vessel 40 and the auxiliary heat pipe radiator 44 to space.

Reactor core 20 dimensions are selected to concomitantly minimize reactor core volume but still provide sufficient surface area for passive decay heat removal by radiation into space. Typical design parameters, for example, indicate a core diameter of 0.4 m and a core height of 0.5 m. This relatively large height-to-diameter ratio (1:25) not only enables passive removal of decay heat but also at least partially removes fission heat during operation.

Reactor core 20 is a fast spectrum pellet bed reactor of modular and scalable design. As best shown in FIGS. 1, 3, and 4 annular reactor core 20 is sectored into three 120° sectors 21. Each core sector 21 is self-contained and capable of independent operation or cooperation with remaining sector cores 21 in a critical reactor assembly. Further, each core sector 21 has its own closed Brayton cycle engine 30 operatively associated therewith, as well as separate radial helium coolant ducts, enabling independent cooling.

Each core sector divider wall 50 is preferably of graphite or other material compatible with the propellant. Further, each divider wall 50 also serves as a propellant heat exchanger, thereby further heating propellant when the system is operating in the propulsion mode. The propellant flows axially through slotted channels in divider walls 50 en route from preheater 18 to electric super heater 22 and thruster 24.

Core sectors 21 are radially bounded by hot and cold frits 49, 48, respectively, composed of a composite porous carbon or metallic design. The frits have round openings 6–8 mm in diameter, with an average porosity of 10% to 30% depending upon desired axial flow distribution commensurate with the axial power profile, and to thereby avoid "hot spots."

Each core sector 21 is loaded with spherical fuel pellets 52. Pellets 52 are randomly packed and stacked in self-supporting fashion between hot and cold frits 49, 48. The diameter of fuel pellets 52 can be changed commensurately with thermal power requirements, in order to maintain a low maximum fuel temperature (<1600 K.) and to maintain a low temperature rise across the pellets themselves, also thereby minimizing fuel swelling and fission gas release.

The fuel pellets fully retain fission by-products and provide a large heat transfer area when operating at high power density. The UC or $UO_2$, or any other suitable nuclear fuel, kernel ($\approx$7.5 mm in diameter) is surrounded by multi-layer coatings: porous graphite, high density graphite, and silicon or zirconium carbide outer layer. The TRISO-type fuel pellets may thus present an overall diameter of 10 mm.

Fuel pellet size is also significant with regard to safety in that appropriate pellet size maintains maximum fuel temperature safely below reactor core melting point. The use of fuel pellets 52 further results in uniform fission heating due to the small neutron self shielding effect, in turn resulting in high power density and smaller reactor size and mass.

Use of spherical fuel pellets 52 further simplifies reactor designs and manufacturing processes.

Radiation shield 60, generally shown in FIGS. 1 and 3, located outside reactor core 20, comprises lithium hydride and an aluminum or other metallic honeycombed interior. The entire structure is encased in a stainless steel or other metallic canister. Because of the expected low reactor thermal power (40–200 kw), the radiation shield 60 will be radiatively cooled, eliminating the need for a neutron shield such as tungsten or depleted uranium.

Propulsion mode power conditioner 62, shown in FIG. 1, comprises the necessary electrical components, such as switching elements, transformers, invertors and converters, necessary to supply appropriate electric power from alternators 36 to propellant superheater 22.

Alternators 36 may comprise any of several well known energy conversion devices, including, for example, rotary electric generators, MHD and EGD apparatus, and thermionic and thermoelectric generators, or other energy conversion systems, either static or dynamic. The closed cycle gas turbine engines 30 may also comprise other well known thermodynamic engines, including, for example, Brayton Stirling or Rankine cycle engines.

As shown in FIGS. 3 and 4, two independent reactor control systems are employed. The first system comprises a total of fifteen segmented $Be_2C/B_4C$ control drums 58 equally spaced within the radial $Be_2C$ reflector 46. Five control drums 58 are present in each core sector 21. Control drums 58 maintain the reactor subcritical during launch; less than 80% of the control drums 58 are required to start-up and shut-down the reactor safely.

The second control system comprises 9 $B_4C$ safety rods 63, three in each core sector 21. Safety rods 63 provide redundancy in reactor control since either system is capable of operating the reactor safely. The control drum-safety rod combination, however, ensures sub-criticality of reactor core 20 in the event of a water submersion accident.

Operation of the system in the power mode requires helium or any suitable coolant which also serves as the working fluid for the closed cycle gas turbine engines. Working fluid flows radially through the core sectors 21 from coolant feed channel 62 exiting through coolant exit channel 64 to turbines 32. Exiting turbines 32, the working fluid flows to the respective heat pipes 54 of main radiator 38, thereby radiating heat to space. The cooled working fluid is then routed through compressors 34; back to reactor coolant feed channel 62, radially through cold frit 48 and core 20 through hot frit 49, thence to coolant exit channel 64, and back to turbines 32.

During operation of the system in the power mode, propellant preheater 18, dividing wall heat exchanger 50, and electric superheater 22 are not in use and therefore do not affect system operation. During the propulsion mode, however, propellant preheater heats liquid hydrogen, or any other suitable propellant, at about 20 K to approximately the same temperature of the working fluid at the inlet of the reactor core (700–850 k). Without the use of waste heat, reactor thermal power would have to be increased 75–85% during the propulsion mode. This would also increase fuel swelling and fission gas release. Because reactor core temperature and reactor operating parameters are maintained nearly the same during power and propulsion modes, Isp of the system would be less than 600 s. In order to increase Isp without raising reactor core temperature, electric superheater 22 is employed, thereby raising Isp to more than 700 s; more than twice that possible with chemical thermal propulsion systems.

Non-nuclear ground testing of the bimodal nuclear power and propulsion system can be accomplished using electric heaters and non-nuclear fuel pellets. Test results in both power and propulsion modes can be used to benchmark reactor thermal hydraulics models, examine the operation of the energy conversion and propulsion systems, characterize the pressure and flow fluids in the reactor core, and measure indicated stresses in the reactor core structure.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, and of the corresponding application(s), are hereby incorporated by reference.

What is claimed is:

1. A bimodal nuclear power and propulsion system comprising:
   means comprising a sectored reactor core;
   means comprising a plurality of closed cycle gas turbine engines in operative association with said sectored reactor core; and,
   means comprising a plurality of heat exchangers heated by said means comprising a plurality of closed cycle gas turbine engines and said means comprising a sectored reactor core wherein the operating parameters of the reactor core are maintained the same during both the power and propulsion modes.

2. The invention of claim 1 wherein each sector of said means comprising a sectored reactor core comprises a 120° core sector bounded by axially extending divider walls.

3. The invention of claim 2 wherein said axially extending divider walls comprise at least one of said means comprising a plurality of heat exchangers for heating propellant.

4. The invention of claim 2 wherein each said 120° core sector is radially bounded by cylindrical frits.

5. The invention of claim 1 wherein said means comprising a sectored reactor core is loaded with spherical fuel pellets.

6. The invention of claim 5 wherein said spherical fuel pellets comprise UC.

7. The invention of claim 5 wherein said spherical fuel pellets comprise $UO_2$.

8. The invention of claim 5 wherein the diameter of said spherical fuel pellets comprises a function of power and safety parameters.

9. The invention of claim 2 wherein at least one of said means comprising a plurality of closed cycle gas turbine engines is in operative association with at least one of said 120° core sectors.

10. The invention of claim 2 wherein said means comprising a plurality of closed cycle gas turbine engines comprises a plurality of closed Brayton cycle engines.

11. The invention of claim 10 wherein at least one of said plurality of closed Brayton cycle engines is in operative association with at least one of said 120° core sectors.

12. The invention of claim 2 wherein each of said 120° core sectors is self contained and independently operable.

13. The invention of claim 2 wherein each of said 120° core sectors is jointly operable with each other of said 120° core sectors.

14. The invention of claim 1 wherein at least one of said means comprising a plurality of heat exchangers is heated with waste heat from at least one of said means comprising a plurality of closed cycle gas turbine engines.

15. The invention of claim 1 wherein at least one of said means comprising a plurality of heat exchangers is heated with electric power from at least one of said means comprising a plurality of closed cycle gas turbine engines.

16. The invention of claim 14 wherein said at least one of said means comprising a plurality of heat exchangers heated with waste heat comprises a propellant preheater.

17. The invention of claim 15 wherein said at least one of said means comprising a plurality of heat exchangers heated with electric power comprises an electric heater for superheating propellant and thereby increasing specific impulse of said propellant.

18. A method of bimodally operating a nuclear power and propulsion system comprising the steps of:
   a) sectoring a reactor core;
   b) operatively associating a plurality of closed cycle gas turbine engines with the sectored reactor core;
   c) heating a plurality of heat exchangers by the plurality of closed cycle gas turbine engines and the sectored reactor core; and
   d) maintaining the operating parameters of the reactor core the same during both power and propulsion modes.

19. The method of claim 18 wherein the step of sectoring a sectored reactor core further comprises the step of bounding 120° core sectors with axially extending divider walls.

20. The method of claim 19 wherein the step of bounding 120° core sectors with axially extending divider walls further comprises the step of providing heat exchangers in the divider walls for heating propellant.

21. The method of claim 19 wherein the step of bounding 120° core sectors further comprises the step of radially bounding the 120° core sectors by cylindrical frits.

22. The method of claim 18 comprising the step of loading the sectored reactor core with spherical fuel pellets.

23. The method of claim 22 wherein the step of loading the sectored reactor core with spherical fuel pellets further comprises the step of loading UC fuel pellets.

24. The method of claim 22 wherein the step of loading the sectored reactor cores with spherical fuel pellets further comprises the step of loading $UO_2$ fuel pellets.

25. The method of claim 22 wherein the step of loading the sectored reactor core with spherical fuel pellets further comprises the step of loading spherical fuel pellets comprising a diameter which is a function of power and safety parameters.

26. The method of claim 19 further comprising the step of operatively associating at least one of the plurality of closed cycle gas turbine engines with at least one of the 120° core sectors.

27. The method of claim 19 wherein the step of operatively associating a plurality of closed cycle gas turbine engines further comprises the step of operatively associating a plurality of closed Brayton cycle engines.

28. The method of claim 27 wherein the step of operating associating a plurality of closed Brayton cycle engines further comprises the step of operatively associating at least one of the plurality of closed Brayton cycle engines with at least one of the 120° core sectors.

29. The method of claim 19 further comprising the step of independently operating each of the 120° core sectors.

30. The method of claim 19 further comprising the step of jointly operating each of the 120° core sectors with each other 120° core sector.

31. The method of claim 18 wherein the step of heating a plurality of heat exchangers further comprises the step of heating at least one of the heat exchangers with waste heat from at least one of the plurality of closed cycle gas turbine engines.

32. The method of claim 18 wherein the step of heating a plurality of heat exchangers further comprises the step of heating at least one of the heat exchangers with electric power from at least one of the plurality of closed cycle gas turbine engines.

33. The method of claim 31 wherein the step of heating at least one of the heat exchangers with waste heat further comprises the step of preheating a propellant.

34. The method of claim 32 wherein the step of heating at least one of the heat exchangers with electric power further comprises the step of superheating propellant and thereby increasing specific impulse of the propellant.

35. A method of testing a bimodal space nuclear power and propulsion system comprising the steps of:
 a) providing electric heaters for the system;
 b) providing non-nuclear fuel pellets for the system;
 c) testing the system with the electric heaters and non-nuclear fuel pellets; and
 d) thereafter benchmarking reactor thermal hydraulics models and examining operation of energy conversion and propulsion systems.

* * * * *